US011402596B2

(12) United States Patent
Meier et al.

(10) Patent No.: US 11,402,596 B2
(45) Date of Patent: Aug. 2, 2022

(54) TERMINAL SYSTEM ASSEMBLIES WITH BREAKOUT/ADAPTER MODULES

(71) Applicant: OPTERNA AM, INC., Sterling, VA (US)

(72) Inventors: Gerald Joseph Meier, Olathe, KS (US); Ravindra K. Vora, Freehold, NJ (US); Panakkal Sadasivan Subin, Ernakulam (IN); Mundackal Muhammedali Beevi Kunju, Ernakulam (IN); Biji Mathew Arakkakudy, Ernakulam (IN); Aravind Puthenveedu Jayaprakash, Ernakulam (IN); Renjith Rajan, Cochin (IN)

(73) Assignee: OPTERNA AM, INC., Sterling, VA (US)

( * ) Notice: Subject to any disclaimer, the term of this patent is extended or adjusted under 35 U.S.C. 154(b) by 0 days.

(21) Appl. No.: 17/083,284

(22) Filed: Oct. 28, 2020

(65) Prior Publication Data

US 2021/0124139 A1     Apr. 29, 2021

Related U.S. Application Data

(60) Provisional application No. 63/050,006, filed on Jul. 9, 2020, provisional application No. 62/926,616, filed on Oct. 28, 2019.

(51) Int. Cl.
*G02B 6/44* (2006.01)
(52) U.S. Cl.
CPC ......... *G02B 6/4457* (2013.01); *G02B 6/4472* (2013.01)

(58) Field of Classification Search
CPC .................................................... G02B 6/4457
See application file for complete search history.

(56) References Cited

U.S. PATENT DOCUMENTS

| 3,346,705 A | 10/1967 | Slinkard et al. |
| 7,715,679 B2 | 5/2010 | Kowalczyk et al. |

(Continued)

FOREIGN PATENT DOCUMENTS

KR        20120037947 A   *   4/2012  ........... G02B 6/4452

OTHER PUBLICATIONS

Search Report dated Jan. 28, 2021 in corresponding International Application No. PCT/US2020/057808, 3 pages.

(Continued)

*Primary Examiner* — Charlie Y Peng
(74) *Attorney, Agent, or Firm* — MH2 Technology Law Group LLP

(57) ABSTRACT

A terminal system assembly includes a base plate, a spool, an adapter module for securing a connection between a fiber of an input fiber cable and a fiber of an output fiber cable, and a cable management plate coupled with the spool. The spool is rotatably mounted to the base plate and is configured to receive the input fiber cable. The adapter module is configured to be coupled with the cable management plate. The spool containing the fiber input cable is allowed to freely rotate until the adapter module is coupled with the cable management plate. The adapter module includes an anti-rotation portion that is configured to cooperate with a portion of the base plate to prevent rotation of the spool and the adapter module when the adapter module is coupled with the spool.

44 Claims, 13 Drawing Sheets

(56) References Cited

U.S. PATENT DOCUMENTS

| | | |
|---|---|---|
| 2004/0170369 A1 | 9/2004 | Pons |
| 2004/0200919 A1 | 10/2004 | Burke et al. |
| 2015/0093088 A1* | 4/2015 | Matz .................... G02B 6/4446 |
| | | 385/135 |
| 2015/0286023 A1* | 10/2015 | Van Baelen ......... G02B 6/4466 |
| | | 385/135 |
| 2018/0299632 A1 | 10/2018 | Van Baelen et al. |
| 2019/0064466 A1* | 2/2019 | Schomisch .......... G02B 6/4479 |

OTHER PUBLICATIONS

Written Opinion dated Jan. 28, 2021 in corresponding International Application No. PCT/US2020/057808, 4 pages.

* cited by examiner

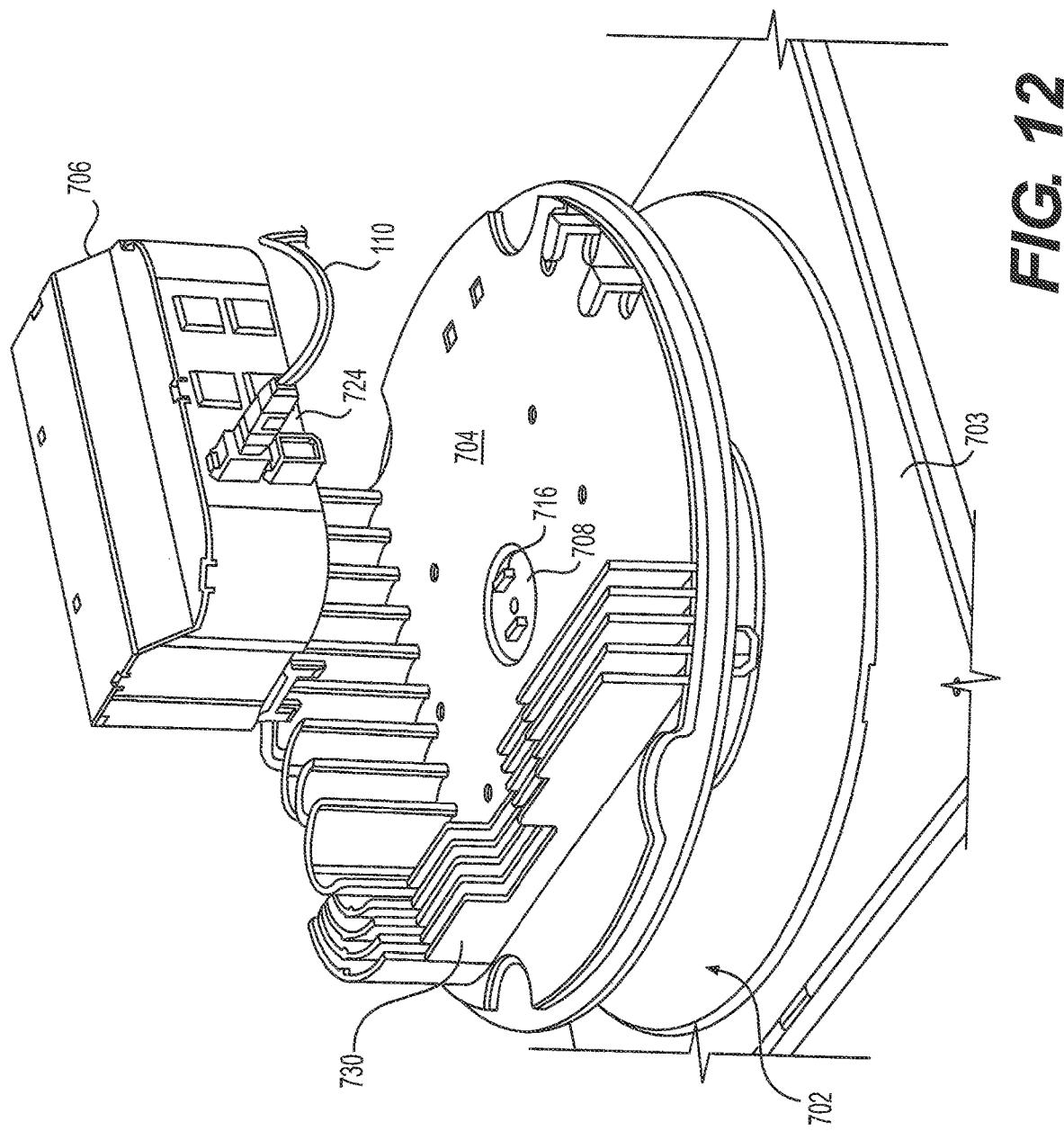

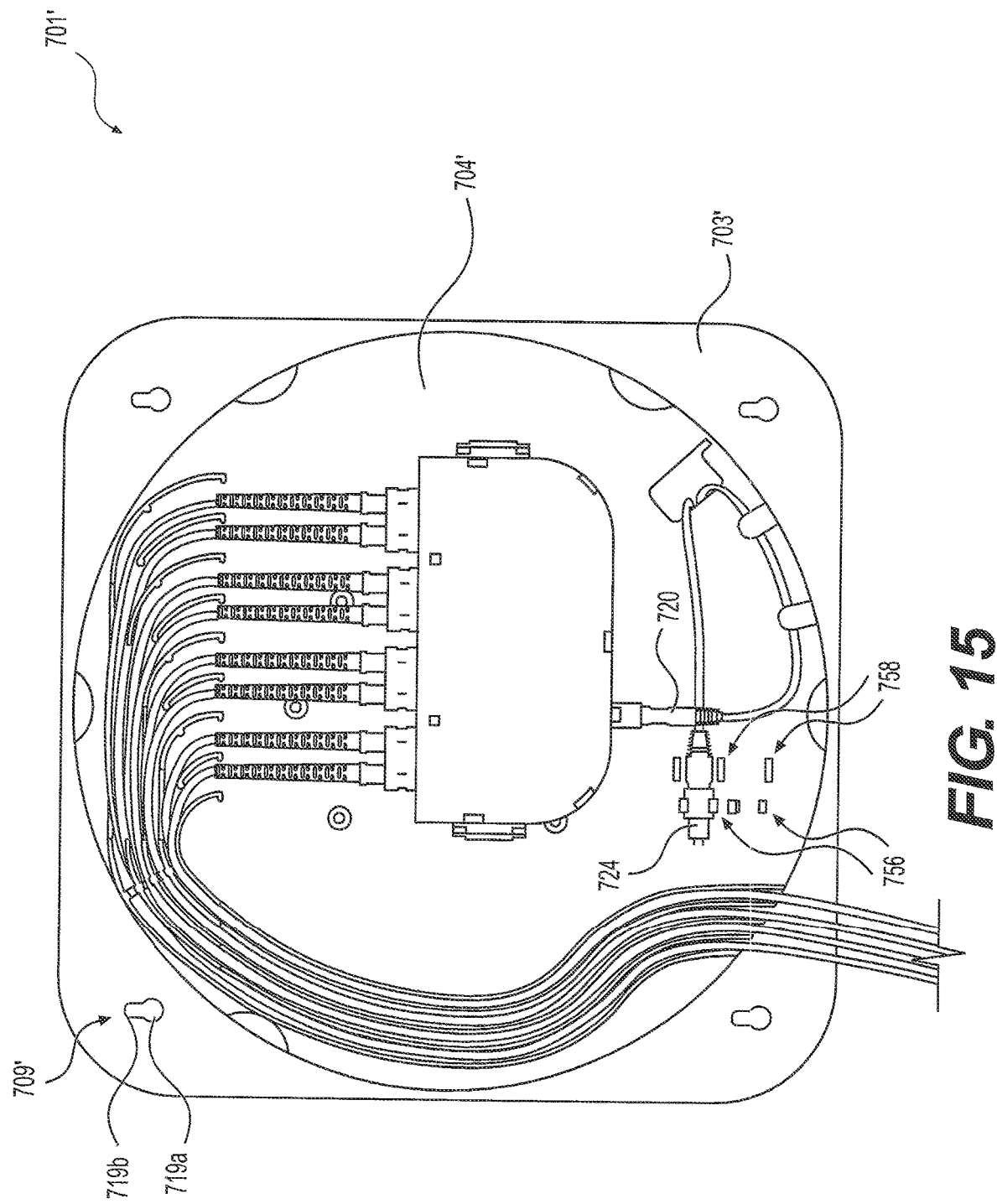

TERMINAL SYSTEM ASSEMBLIES WITH BREAKOUT/ADAPTER MODULES

CROSS-REFERENCE TO RELATED APPLICATIONS

This application claims the benefit of U.S. Provisional Application No. 62/926,616, filed Oct. 28, 2019, and U.S. Provisional Application No. 63/050,006, filed Jul. 9, 2020, the disclosure of which is hereby incorporated by reference herein in its entirety.

BACKGROUND

The present disclosure relates to a terminal system assembly that includes a breakout/adapter module for connecting fiber optic cables.

A terminal system assembly (TSA) is used to interconnect multiple fibers, typically originating from a common point, and distribute them to multiple different locations with output fiber cables. Typically, the connections are made between a larger multi-fiber bundle input cable and individual output fiber cables. A TSA is typically used in buildings such as multi-unit residences or commercial/office buildings. There could be a single TSA per building or perhaps one or more per floor or any combination in between depending on the fiber connection needs and capacity of the building.

One recurring issue faced when dealing with the installation of TSAs is how much input fiber cable is required to connect the TSA to some common point, which is often outdoors where the connections to the larger fiber networks (e.g., a city wide fiber network) are made. The common point could also be within the same building, perhaps on another floor or in the basement of the building. No matter the location of the common point, it is often necessary to physically locate the TSA before the required length of fiber cable between the TSA and the common point is known. This presents two problems. First, one must approximate and prepare a length of the input fiber cable before installing the TSA. If the approximated length is too short, the connection to the TSA cannot be made without a fiber cable splice and another length of input fiber cable. Conversely, if the approximated length is too long, then the excess slack of the fiber cable must be stored somewhere along the length of fiber cable, potentially introducing unwanted bends and thus unwanted bend loss into the fiber cable path. Second, it might be necessary to relocate the TSA so that the chosen or available fiber cable length is approximately correct, which could mean placing the TSA in an undesirable location. Accordingly there is a need to safely store excess fiber cable after installation and to feed fiber cable from an installed TSA. There is also a need for a convenient way to store the input fiber cable prior to installation of the TSA.

Affixing the TSA to its permanent location before connecting the input fiber cable to the common point would be convenient. Prior TSAs that include an external spool of fiber cable do not allow the TSA to be affixed to its permanent location because the enclosure of the TSA must rotate with the external spool of fiber cable. This configuration also prevents the installer from making the input fiber connections to the adapter pack prior to connecting the input fiber cable.

In some TSAs, input and output fiber cables enter and exit the TSA in only one direction. This configuration requires that the cables always be routed in the same direction. This configuration often makes the external installation difficult and the routing of cables to and from the TSA cumbersome. This situation can occur when the fiber input cable must be routed to a higher floor, but the fiber output cables are downwardly aligned, meaning that the fiber cables must make a 180 degree turn after leaving the TSA. This often results, especially with less experienced installers, in damage to the fiber cable, due to inadvertent bend loss.

It is also important to protect the fiber cables as they are routed within the TSA. Typical TSAs contain connection blocks where the fibers of the larger input cable are individually matched to single output cables. Both the input and output cables are separately routed through the enclosure, with the installer having the responsibility of routing the fiber cables in such a way so as to avoid bends in the cable and thus bend loss. Installers, who may or may not be conscious of this responsibility, might not always appreciate the impact of their craftsmanship. Routing secured by cable ties or other more industrial type retaining clips could easily create inadvertent bends in the fiber cables, thus causing undesired loss of signal strength in the fiber cables.

Therefore, it is desirable to have a TSA that conveniently stores fiber cable prior to installation and houses excess fiber cable after the input cable connection has been made. It is also desirable for the TSA to house the input fiber cable to output fiber cable connections and safely route the cables within the TSA to avoid bend loss while allowing the input and output fiber cables to enter/exit from multiple sides of the TSA.

SUMMARY

According to various embodiments of the disclosure, a terminal system assembly includes a base plate, a spool, an adapter module for securing a connection between a fiber of an input fiber cable and a fiber of an output fiber cable, and a cable management plate coupled with the spool. The spool is rotatably mounted to the base plate and is configured to receive the input fiber cable. The adapter module is configured to be coupled with the cable management plate. The adapter module includes an anti-rotation portion that is configured to cooperate with the base plate to prevent rotation of the spool and the adapter module when the adapter module is coupled with the spool.

In some aspects, the anti-rotation portion of the base plate includes a pair of locking posts extending from a surface of the base plate, and the anti-rotation portion of the adapter module includes a pair of locking bars extending in opposite directions from opposite sides of the adapter module.

According to various aspects, each of the locking posts has a U-shaped cross-section defining a channel, and each of the locking bars is configured to be aligned with and received by a respective one of the locking posts.

According to some aspects, the spool includes a hub having an opening configured to receive a spindle extending from the base plate, and the spindle includes the anti-rotation portion of the base plate.

In some embodiments, the terminal system assembly further includes a spool locking washer having engagement structures configured to be coupled with the anti-rotation portion of the base plate. The anti-rotation portion of the base plate includes openings in an end wall of the spindle. The spool locking washer has including projections extending from an opposite side of the washer relative to the engagement structures. The projections are configured to be coupled with the anti-rotation portion of the adapter module. The anti-rotation portion of the adapter module including openings in a wall of the adapter module.

In various aspects, the spool is allowed to freely rotate relative to the base plate until the breakout/adapter module is coupled with the cable management plate.

According to some aspects, the adapter module includes input ports configured to receive a connectorized end of the input fiber cable and output ports configured to receive connectorized ends of the output fiber cables.

In some aspects, the adapter module is configured to breakout individual fibers from the input fiber cable and couple each of the individual fibers with an adapter.

According to various aspects, the anti-rotation portion of the adapter module and the anti-rotation portion of the base plate are configured to prevent rotation of the cable management plate relative to the base plate when the adapter module is coupled with the spool.

In various aspects, the base plate includes positive grip features on opposite side walls of the base plate configured to receive a user's fingers to facilitate mounting of the terminal system assembly to a mounting surface and/or removal of the terminal system assembly from the mounting surface.

According to some embodiments, the terminal system assembly further includes an enclosure configured to receive the base plate, the spool, the adapter module, and the cable management plate.

BRIEF DESCRIPTION OF THE DRAWINGS

FIG. 12 is a partial exploded view of the terminal system assembly of FIG. 7.

FIG. 15 is a front view of the terminal system assembly of FIGS. 13 and 14.

DETAILED DESCRIPTION OF EMBODIMENTS

Reference will now be made in detail to the exemplary aspects of the present disclosure that are illustrated in the accompanying drawings. Wherever possible, the same reference numbers will be used throughout the drawings to refer to the same or like structure.

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
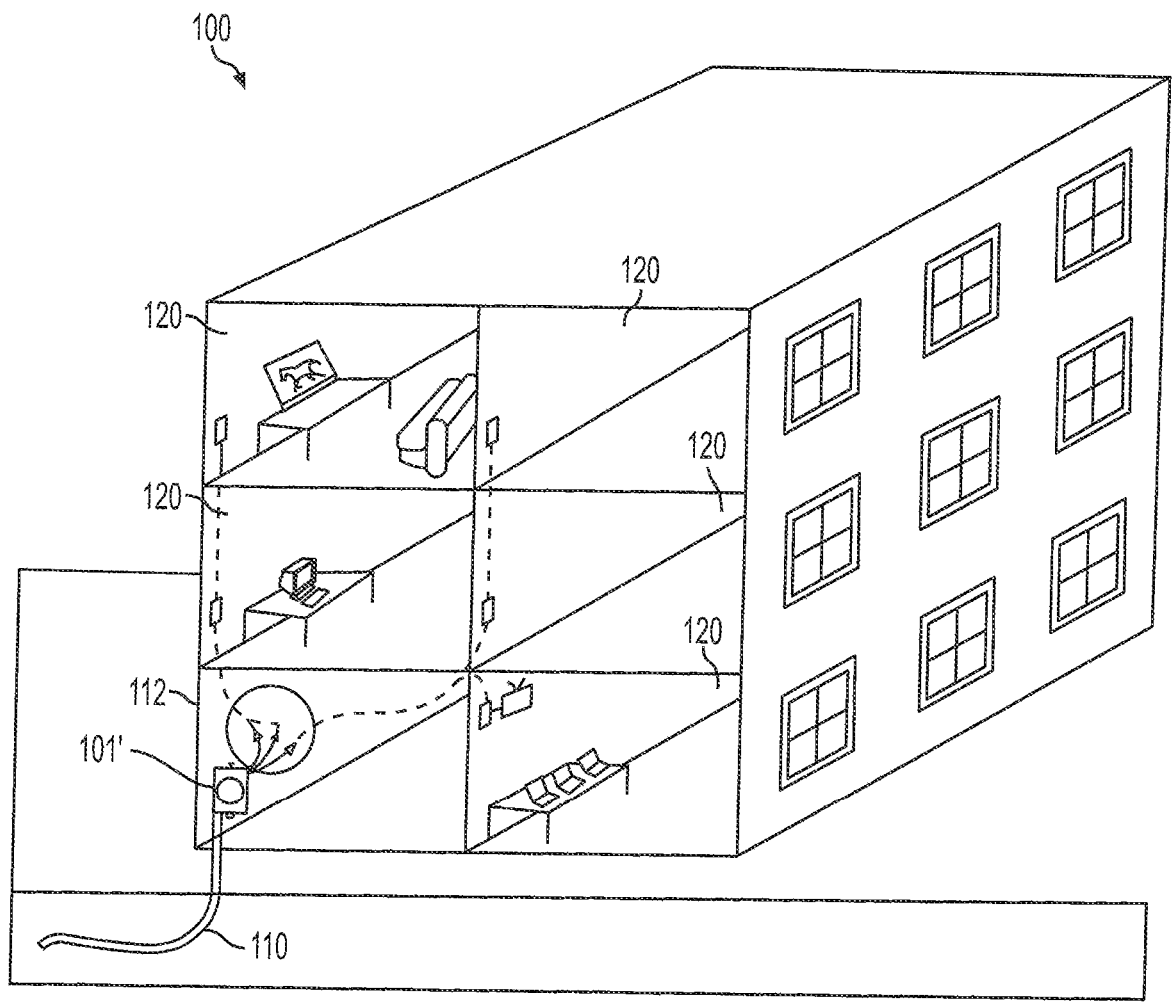
FIG. 1 depicts a multi-unit building which is a typical application situation for the use of a terminal system assembly.
Figure 2:
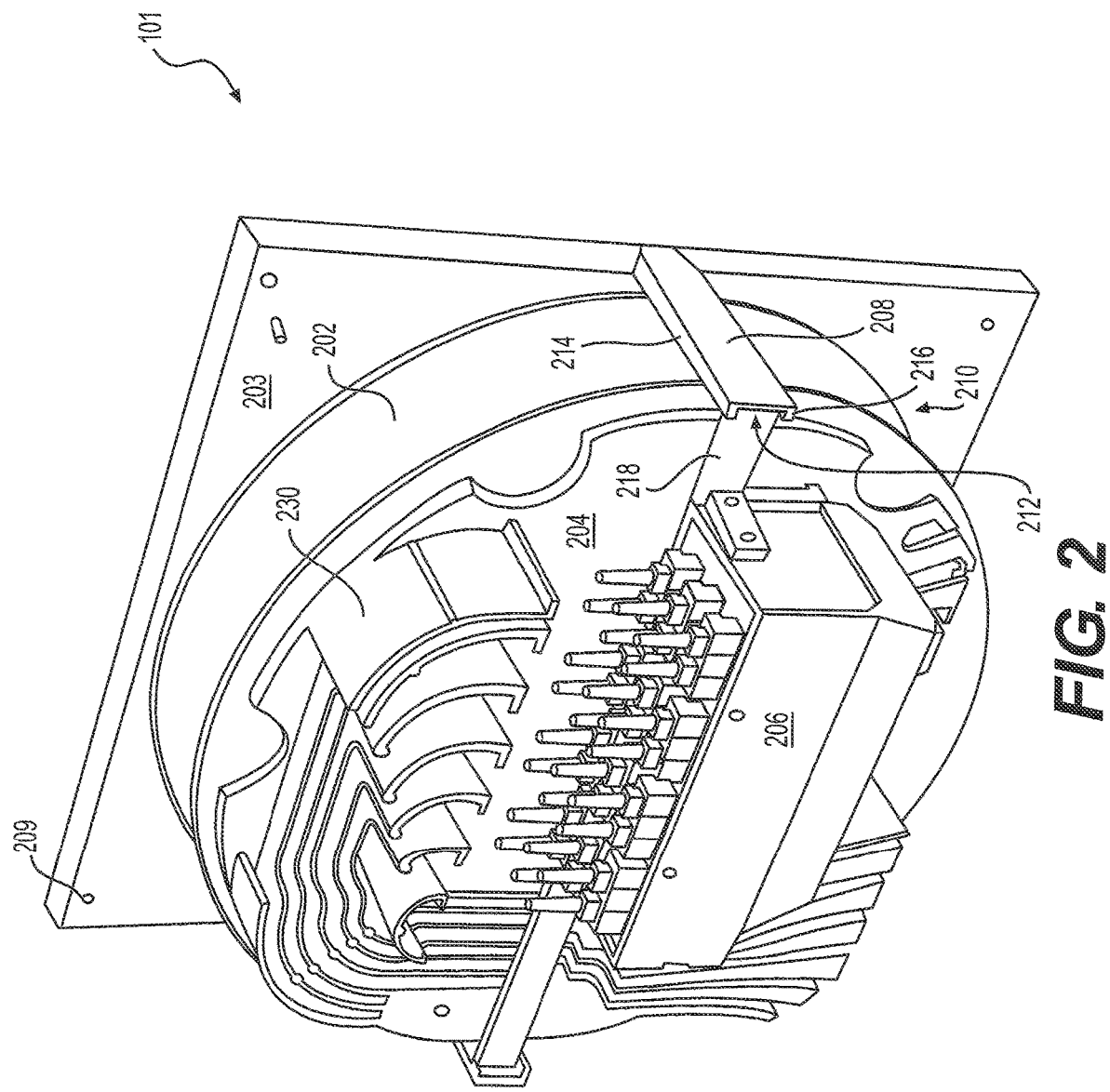
FIG. 2 is a perspective view of an exemplary terminal system assembly according various aspects of the disclosure.
Figure 3:
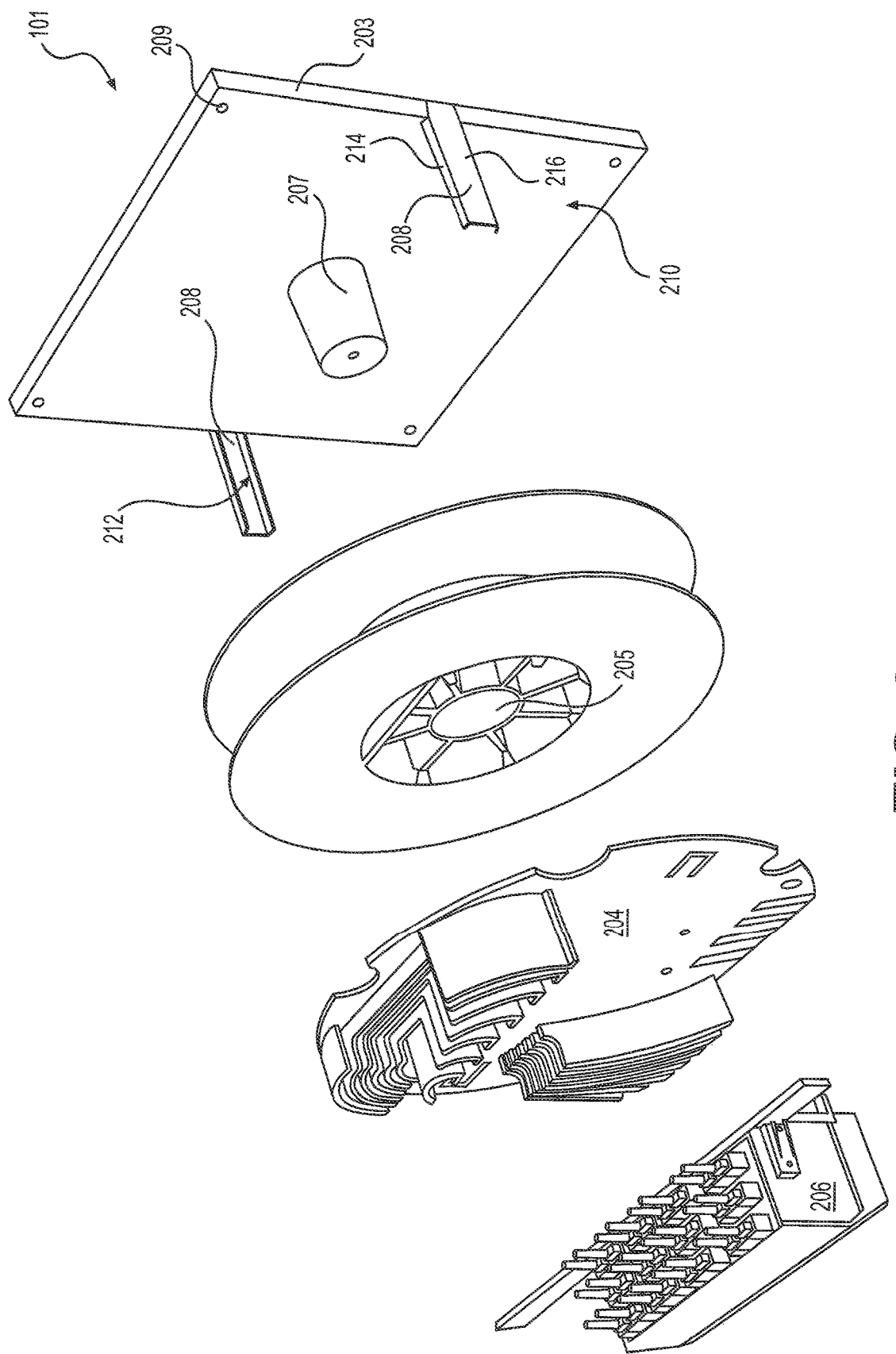
FIG. 3 is an exploded view of the terminal system assembly of FIG. 2.
Figure 5:
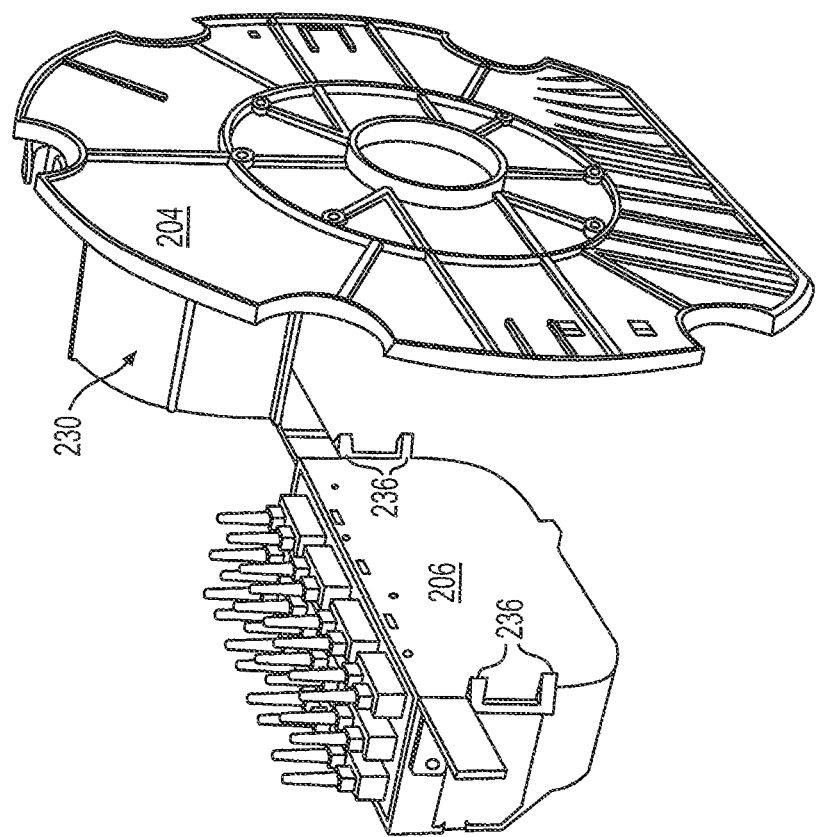
FIG. 5 is a second perspective view of the cable management plate and the breakout/adapter module of the terminal system assembly of FIG. 2.
Figure 4:
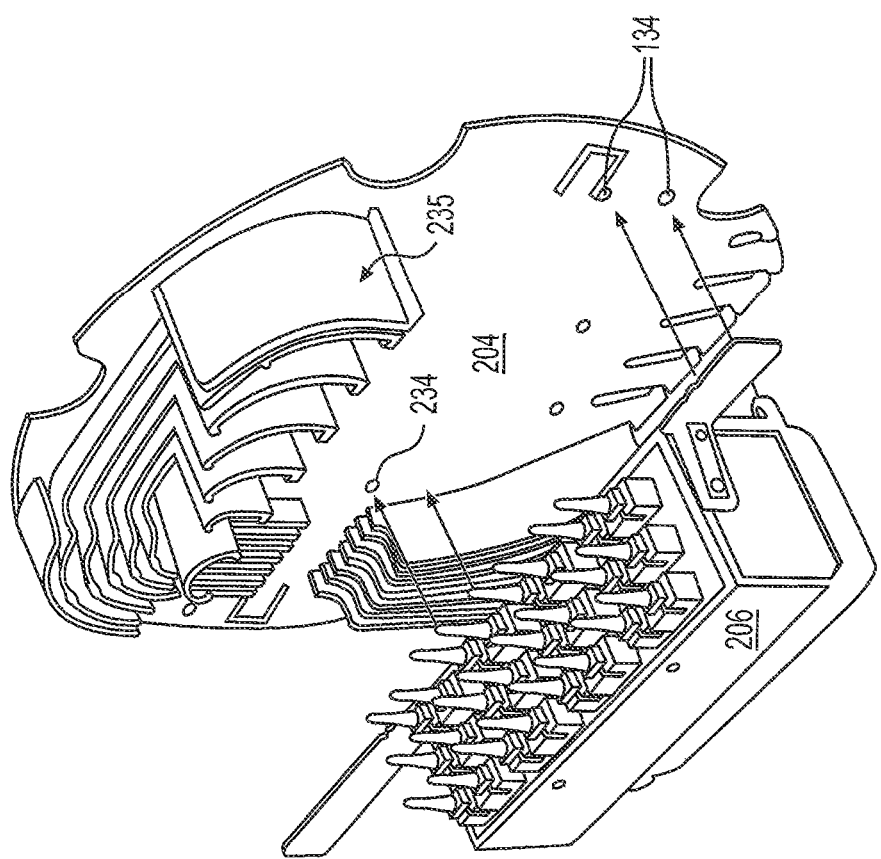
FIG. 4 is a first perspective view of the cable management plate and the breakout/adapter module of the terminal system assembly of FIG. 2.

FIG. 1 depicts a multi-unit building 100 according to one embodiment of the invention. The multi-unit building 100 includes several separate units 120, one or more of which have a necessity or desire to have fiber cable service in their unit. Each separate unit 120 typically only needs a single output fiber connection 112, but a typical situation in a multi-unit building 100 would have some plurality if not the entire building needing or desiring the fiber cable service. The fiber cable provider will run a larger bundled input fiber cable 110 to the multi-unit building 100 where it is routed and connected through a terminal system assembly (TSA) 101. TSA 101 can be secured to a mounting surface, such as an interior wall within the building or a surface of a pre-installed electrical box, for example, in the basement or in a communication closet within the multi-unit building 100. Input fiber cable 110 is actually multiple fibers bundled together into a single, larger cable for easier routing to some central location. The input fiber cable 110 is inputted to TSA 101. At TSA 101, the individual fibers that compose input fiber cable 110 are separately connected to individual output cables 112. Then each output fiber cable 112 is routed to a separate unit 120, where the output fiber cable 112 can be connected to other equipment that is capable of translating the fiber cable signal into useful information.

Referring to FIGS. 2-6, an exemplary TSA in accordance with various aspect of the disclosure is illustrated. The exemplary TSA 101 includes a spool 202, a cable management plate 204, and a module 206, for example, a breakout/adapter module. The spool 202, which houses input fiber cable(s) 110, is rotatably mounted to a base plate 203. For example, the spool 202 may include a hub 205 having an opening (not shown) configured to receive a spindle 207 extending from the base plate 203. The base plate 203 may be substantially flat for mounting against a mounting surface. The base plate 203 may include a plurality of mounting holes 209. Fasteners can be placed through the mounting holes 209 to securely mount the TSA 101 to the mounting surface. In other embodiments, other suitable means of attachment can used to mount base plate 203 to the mounting surface. The base plate 203 can be made of any suitable rigid material, for example, wood, plastic, or metal. The mounting surface can be any surface at a desired location for the TSA 101. For example, the mounting surface can be a back surface of a pre-installed electrical enclosure, a wall of a building, or any other suitable surface.

The cable management plate 204 is fixedly coupled to and rotates with the spool 202. The cable management plate 204 can be integral with the spool 202 or can be a separate part attached to the spool 202 by any suitable attachment means, for example, fasteners. The cable management plate 204 can include a set of fiber cable guides 230 further described below.

The breakout/adapter module 206 is configured to be fixedly coupled with the cable management plate 204. In the illustrated embodiment, the breakout/adapter module 206 may include fasteners, for example, snap lock fasteners 236, configured to snap lock into aligned openings 234 in the cable management plate 204.

The TSA 101 includes a pair of locking posts 208 extending from a surface 210 of the base plate 203. The locking posts 208 can each have a U-shaped cross-section when viewed in a direction perpendicular to the surface 210 of the base plate 203 such that the locking posts 208 each define a channel 212 between opposed end walls 214, 216. The locking posts 208 can be integral with the base plate 203 or can be separate parts attached to the base plate 203 by any suitable attachment means, for example, fasteners.

The TSA 101 includes a pair of locking bars 218 extending from opposite sides of the breakout/adapter module 206. The locking bars 218 can be integral with the breakout/adapter module 206 or can be separate parts attached to the breakout/adapter module 206 by any suitable attachment means, for example, fasteners. When the breakout/adapter module 206 is coupled with the cable management plate 204, the locking bars 218 are structured and arranged to be aligned with and received by the channels 212 of the locking posts. The opposed end walls 214, 216 of the locking posts 208 prevent movement of the locking bars 218 relative to the base plate 203. Because the breakout/adapter module 206 is fixedly coupled to the cable management plate 204, which is in turn fixed coupled with the spool 202, the locking posts 208 and the locking bars 218 cooperate to prevent rotational movement of the spool 202, the cable management plate 204, and the breakout/adapter module 206 relative to the base plate 203.

The breakout/adapter module 206 includes input ports, for example, MPO (multi-fiber push-on) adapters 220, configured to receive connectorized ends of input fiber cables 110 and output ports, for example, SC/APC (splice closure/angled physical contact) adapters 222, configured to received connectorized ends of the output fiber cables 112. The breakout/adapter module 206 is configured to break out individual fibers from the input fiber cable 110 and couple each of the individual fibers with one of the adapters 222. In the illustrated embodiment, the breakout/adapter module 206 is configured to receive two MPO connectors 224 that each terminate input fiber cables 110 having 12 individual fibers. The breakout/adapter module 206 is further configured to optically couple each of the 24 individual fibers with one of the adapters 222. The adapters 222 are configured to receive SC/APC connectors 226. It should be appreciated that the breakout/adapter module 206 can be replaced with other adapter modules that are configured to optically couple input fiber cables with output fiber cables according to user specifications.

Figure 6:
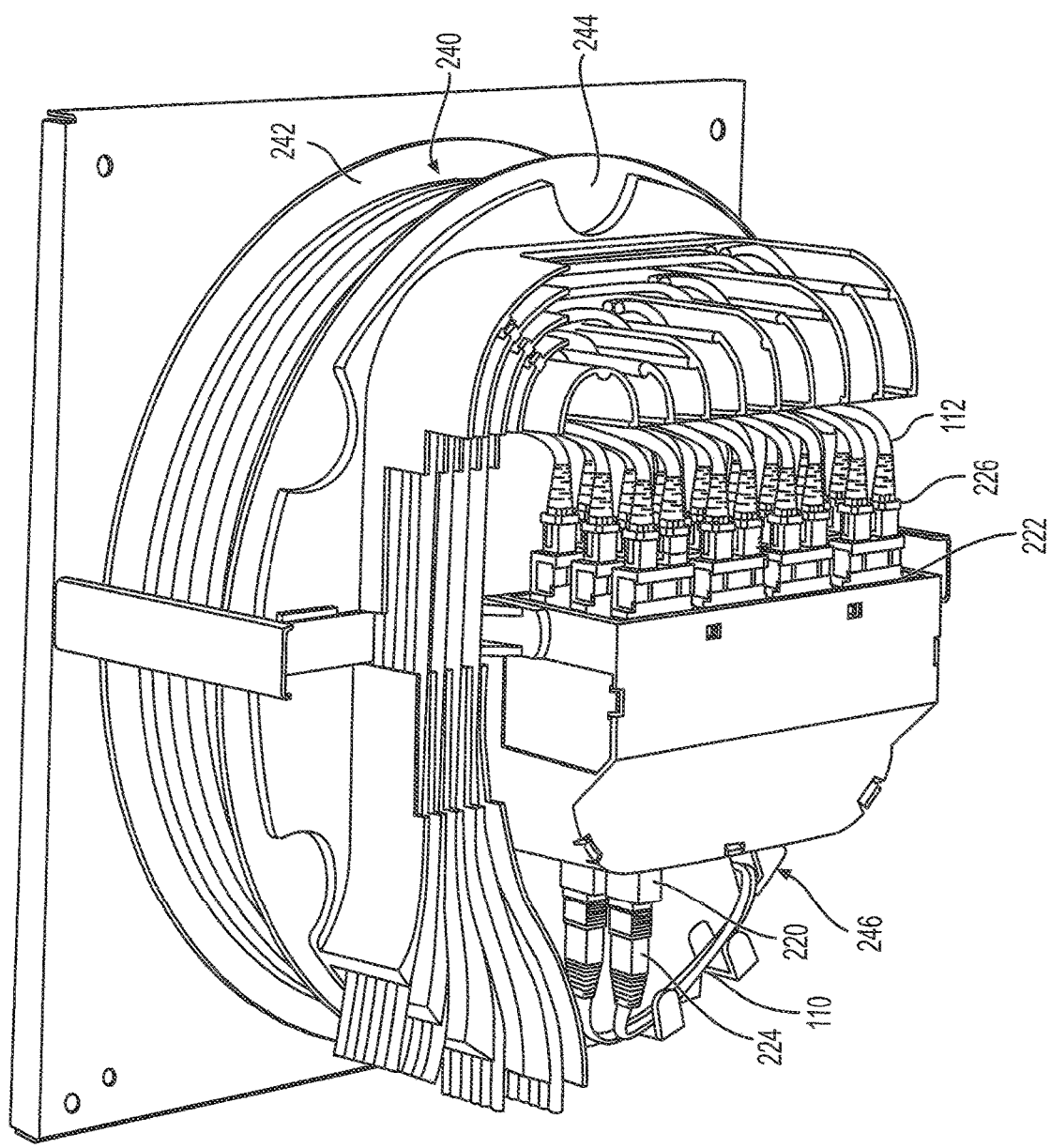
FIG. 6 is a perspective view of the terminal system assembly of FIG. 2 with input and output cables.

The spool 202 includes a spooling area 240 defined by a lower flange 242 and an upper flange 244. The spooling area 240 is used to spool the input fiber cable(s) 110 having multiple individual fibers (e.g., six or twelve fibers) within a single fiber jacket. The spooling area 240 can be sized to spool 50 ft., 100 ft., 200 ft., 350 ft., or more than 350 ft. of the first portion of input fiber cable 110. The input fiber cable(s) 110 can be extended to the maximum storage capacity of spooling area 240. If two input fiber cables 110 are stored, they must be extended together. As shown in FIG. 6, a portion of the input fiber cable(s) 110 is fed through a guidance slot 246 in the upper flange, and the fibers of the input fiber cable(s) are terminated with an 224 connector that is connected to one of the MPO adapters 220. Connectorized ends of the output fiber cables 112 mates with the SC/APC adapters 222 so that the output fiber cables 112 can be optically coupled to the unbundled individual fiber cables of the input fiber cable(s) 110.

Output fiber cables 112 are routed from adapter packs 206 through a series of guides 230. The guides 230 are coupled to the cable management plate 204. The guides 230 are configured to route output fiber cables 112 in a safe and organized manner. In one embodiment, the guides 230 extend perpendicular from the plane of the cable management plate 204. The guides 230 define a plurality of curved channels for receiving the output fiber cables 112. The curved channels of the guides 230 can have specific radii that do not allow the output fiber cables 112 to bend more than the specification of the output fiber cable 112 allows, thereby minimizing bend loss within output fiber cables 112. Thus, the guides 230 provide a convenient and organized way to route the output fiber cables 112 through the TSA 101.

Guides 230 are designed to maintain the output fiber cable 112 signal integrity. Cable management plate 204 and guides 230 are sized such that up to 70 mm cable connection boots, which are sleeves usually made of a flexible material that add a layer of protection to the connector, and up to 4.8 mm diameter cables can be used. Cable management plate 204 and guides 230 are also sized such that the use of Splice On Connectors (SOCs) is facilitated. SOCs eliminate the need for field polishing of fiber cables to terminate connections. In one embodiment, there are at least three sets of guides 230 so that the output fiber cables 112 can make two 90 degree turns and be fanned out for directional distribution. However, more or less guides 230 may be needed based on the bend tolerance specification of the particular output fiber cables 112 used.

In some embodiments, the TSA 101 can also include an environmentally sealed enclosure to protect the connections from environmental dangers. In other embodiments, the TSA 101 does not include an environmentally sealed enclosure. In the case of an environmentally sealed enclosure, the enclosure would include openings for passing one or more of the input fiber cables 110 and a plurality of the output fiber cables 112 cables. These openings can be filled and secured with an input grommet and a set of output grommets.

Referring now to FIGS. 7-12, another exemplary TSA 701 in accordance with various aspect of the disclosure is illustrated. In this embodiment, the TSA 701 includes a spool 702, a cable management plate 704, and a module 706, for example, a breakout/adapter module. The spool 702, which houses input fiber cable(s) 110, is rotatably mounted to a base plate 703. For example, the spool 702 may include a hub 705 having an through hole 715 configured to receive a spindle 707 extending from the base plate 703. The base plate 703 may be substantially flat for mounting against a mounting surface. The base plate 703 may include a plurality of mounting holes 709. Fasteners can be placed through the mounting holes 709 to securely mount the TSA 701 to the mounting surface. In other embodiments, other suitable means of attachment can used to mount base plate 703 to the mounting surface. The base plate 703 can be made of any suitable rigid material, for example, wood, plastic, or metal. The mounting surface can be any surface at a desired location for the TSA 701. For example, the mounting surface can be a back surface of a pre-installed electrical enclosure, a wall of a building, or any other suitable surface.

The cable management plate 704 is fixedly coupled to and rotates with the spool 702. The cable management plate 704 can be integral with the spool 702 or can be a separate part attached to the spool 702 by any suitable attachment means, for example, fasteners. The cable management plate 704 can include a set of fiber cable guides 730 further described below.

The breakout/adapter module 706 is configured to be fixedly coupled with the cable management plate 704. In the illustrated embodiment, the breakout/adapter module 706 may include fasteners, for example, snap lock fasteners 736, configured to snap lock into aligned openings 734 in the cable management plate 704.

The TSA 701 includes a spool locking washer 708. The spool locking washer 708 includes fasteners, for example, snap lock fasteners 712 extending from a first side of the washer 708 and being configured to snap lock into aligned openings 714 in an end wall 710 of the spindle 707. The spool locking washer 708 includes projections 716 extending from a second opposite side of the washer 708. The projections 716 are structured and arranged to be aligned with and received by openings 718 in a wall of the breakout/adapter module 706 when the breakout/adapter module 706 is coupled with the cable management plate 704. The projections 716 from the washer 708 are configured to prevent movement of the breakout/adapter module 706 relative to the washer 708. Because the washer 708 is fixedly coupled with the spindle 707 of the base plate 703 and the breakout/adapter module 706 is fixedly coupled to the cable management plate 704, which is in turn fixed coupled with the spool 702, the projections 716 of the locking washer 708 and the opening 718 of the breakout/adapter module 706 cooperate to prevent rotational movement of the spool 702, the cable management plate 704, and the breakout/adapter module 706 relative to the base plate 703.

The breakout/adapter module 706 includes input ports, for example, MPO (multi-fiber push-on) adapters 720, configured to receive connectorized ends of input fiber cables 110 and output ports, for example, SC/APC (splice closure/angled physical contact) adapters 722, configured to received connectorized ends of the output fiber cables 112. The breakout/adapter module 706 is configured to break out individual fibers from the input fiber cable 110 and couple each of the individual fibers with one of the adapters 722. In the illustrated embodiment, the breakout/adapter module 706 is configured to receive two MPO connectors 724 that each terminate input fiber cables 110 having 12 individual fibers. The breakout/adapter module 706 is further configured to optically couple each of the 24 individual fibers with one of the adapters 722. The adapters 722 are configured to receive SC/APC connectors 726. It should be appreciated that the breakout/adapter module 706 can be replaced with other adapter modules that are configured to optically couple input fiber cables with output fiber cables according to user specifications.

Figure 7:
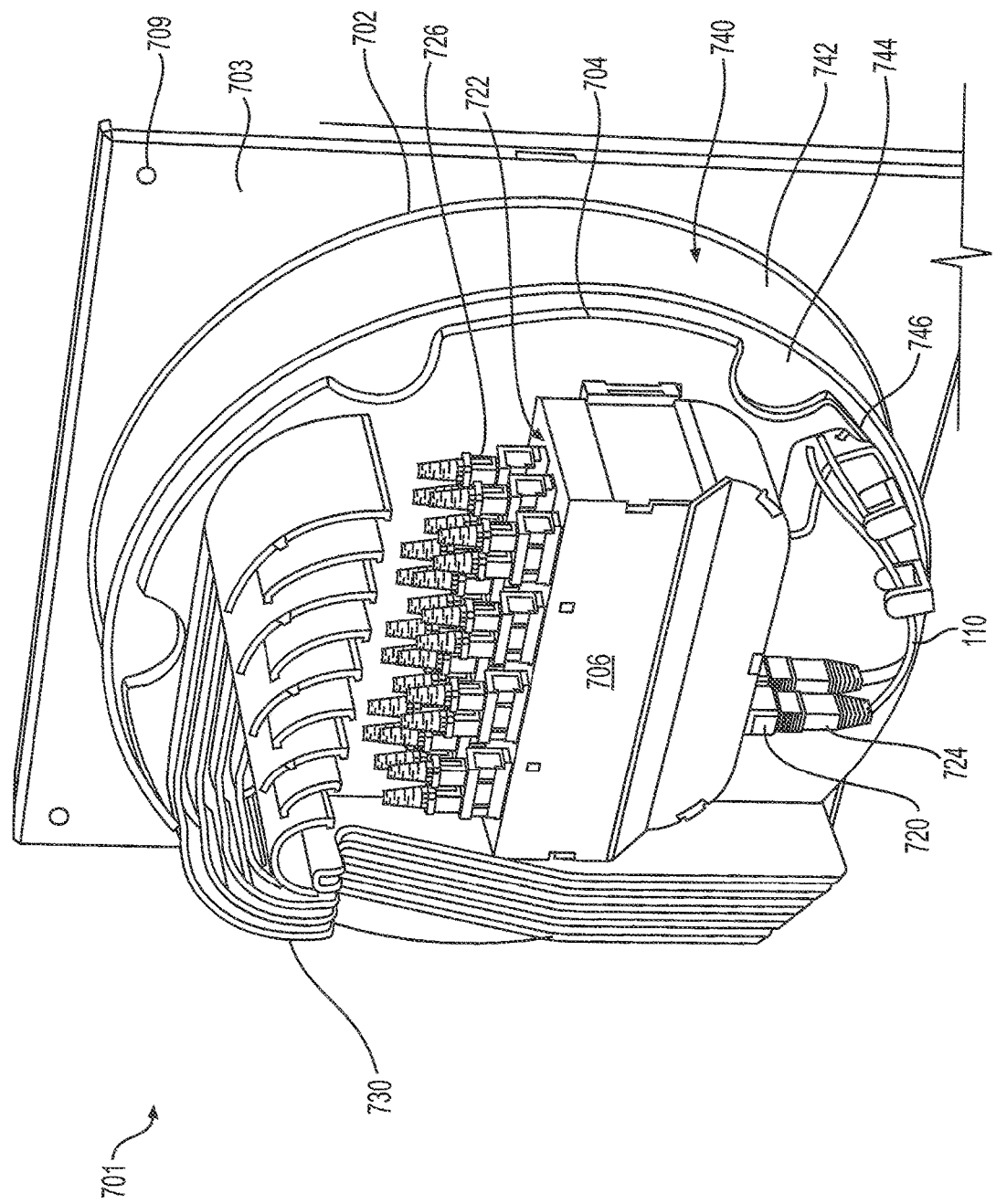
FIG. 7 is a perspective view of another exemplary terminal system assembly according various aspects of the disclosure and with input and output cables.
Figure 8:
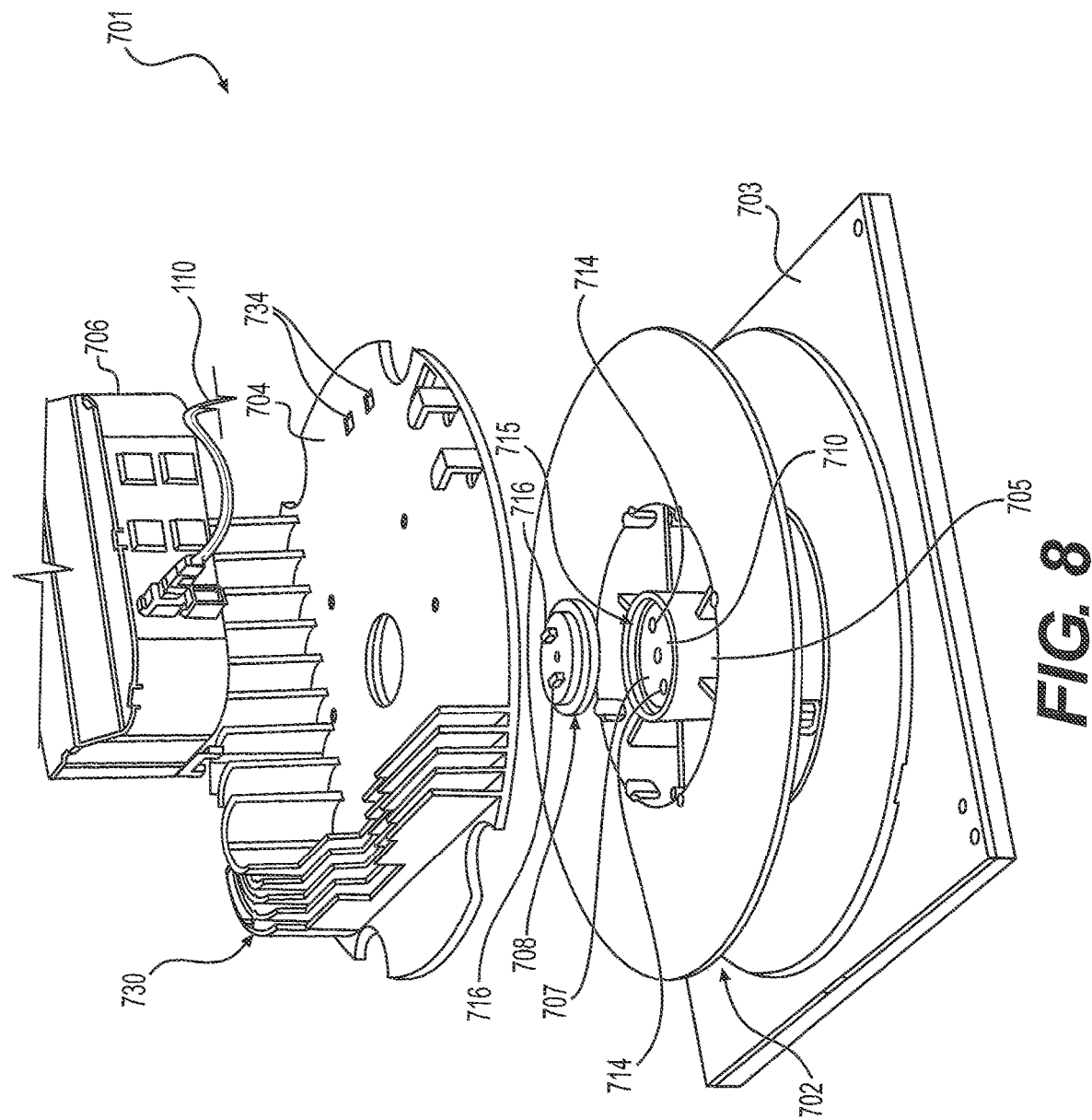
FIG. 8 is a first exploded view of the terminal system assembly of FIG. 7.
Figure 9:
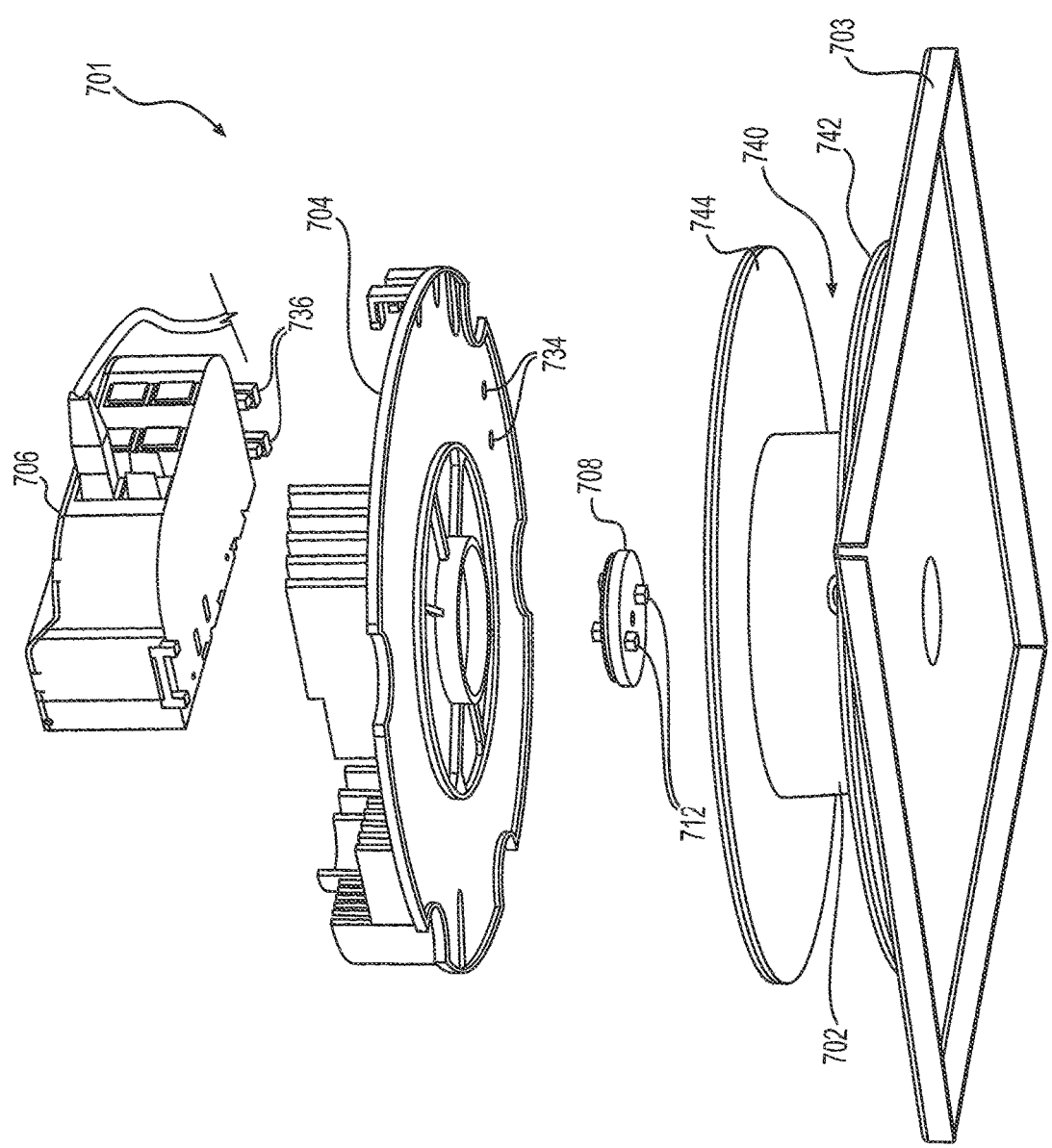
FIG. 9 is a second exploded view of the terminal system assembly of FIG. 7.
Figure 11:
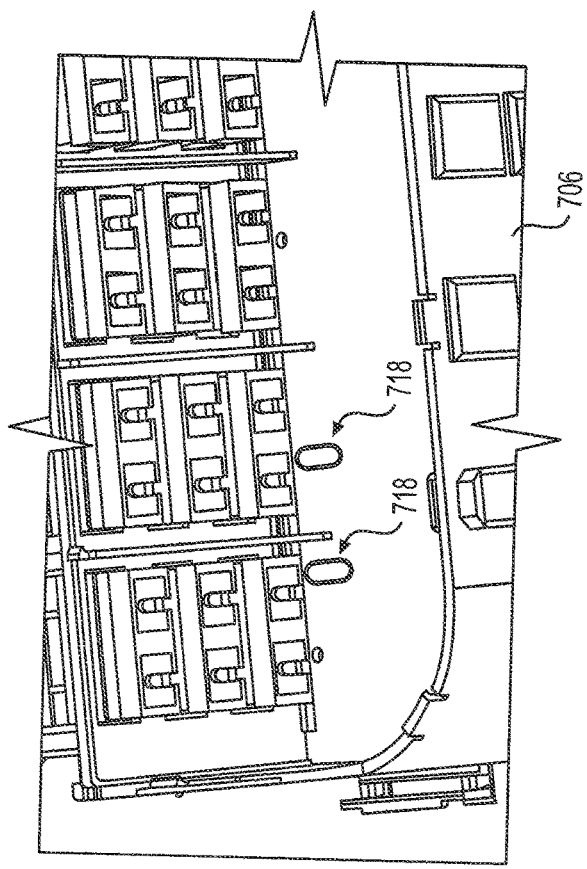
FIG. 11 is an enlarged view of the breakout/adapter module of the terminal system assembly of FIG. 7.
Figure 10:
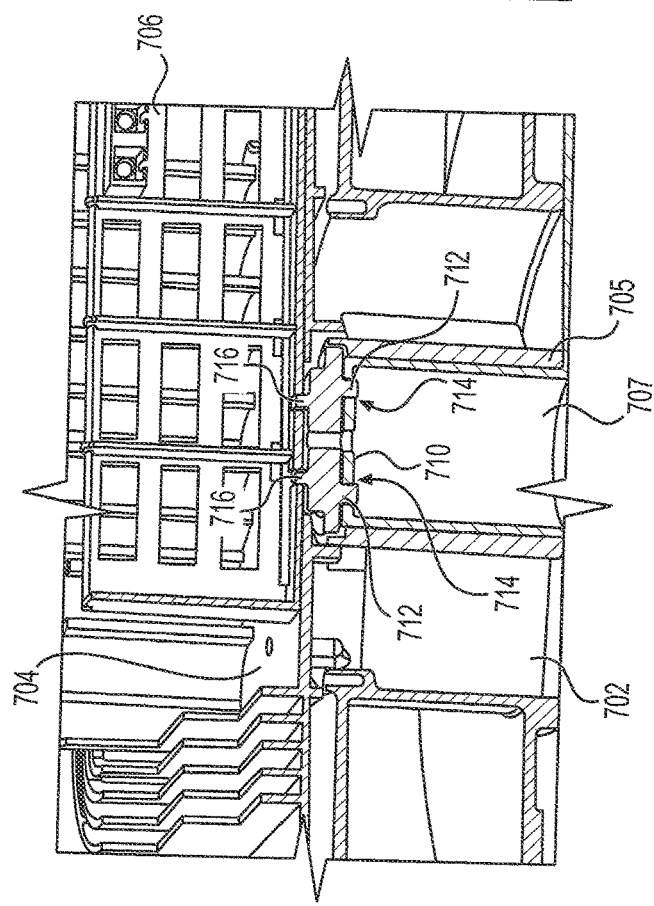
FIG. 10 is an enlarged view of a portion of the terminal system assembly of FIG. 7.

The spool 702 includes a spooling area 740 defined by a lower flange 742 and an upper flange 744. The spooling area 740 is used to spool the input fiber cable(s) 110 having multiple individual fibers (e.g., six or twelve fibers) within a single fiber jacket. The spooling area 740 can be sized to spool 50 ft., 100 ft., 200 ft., 350 ft., or more than 350 ft. of the first portion of input fiber cable 110. The input fiber cable(s) 110 can be extended to the maximum storage capacity of spooling area 740. If two input fiber cables 110 are stored, they must be extended together. As shown in FIG. 7, a portion of the input fiber cable(s) 110 is fed through a guidance slot 746 in the upper flange, and the fibers of the input fiber cable(s) are terminated with an MPO connector 724 that is connected to one of the MPO adapters 720. Connectorized ends of the output fiber cables 112 mates with the SC/APC adapters 722 so that the output fiber cables 112 can be optically coupled to the unbundled individual fiber cables of the input fiber cable(s) 110.

Output fiber cables 112 are routed from adapter packs 706 through a series of guides 730. The guides 730 are coupled to the cable management plate 704. The guides 730 are configured to route output fiber cables 112 in a safe and organized manner. In one embodiment, the guides 730 extend perpendicular from the plane of the cable management plate 704. The guides 730 define a plurality of curved channels for receiving the output fiber cables 112. The curved channels of the guides 730 can have specific radii that do not allow the output fiber cables 112 to bend more than the specification of the output fiber cable 112 allows, thereby minimizing bend loss within output fiber cables 112. Thus, the guides 730 provide a convenient and organized way to route the output fiber cables 112 through the TSA 701.

Guides 730 are designed to maintain the output fiber cable 112 signal integrity. Cable management plate 704 and guides 730 are sized such that up to 70 mm cable connection boots, which are sleeves usually made of a flexible material that add a layer of protection to the connector, and up to 4.8 mm diameter cables can be used. Cable management plate 704 and guides 730 are also sized such that the use of Splice On Connectors (SOCs) is facilitated. SOCs eliminate the need for field polishing of fiber cables to terminate connections. In one embodiment, there are at least three sets of guides 730 so that the output fiber cables 112 can make two 90 degree turns and be fanned out for directional distribution. However, more or less guides 730 may be needed based on the bend tolerance specification of the particular output fiber cables 112 used.

In some embodiments, the TSA 701 can also include an environmentally sealed enclosure to protect the connections from environmental dangers. In other embodiments, the TSA 701 does not include an environmentally sealed enclosure. In the case of an environmentally sealed enclosure, the enclosure would include openings for passing one or more of the input fiber cables 110 and a plurality of the output fiber cables 112 cables. These openings can be filled and secured with an input grommet and a set of output grommets.

Figure 13:
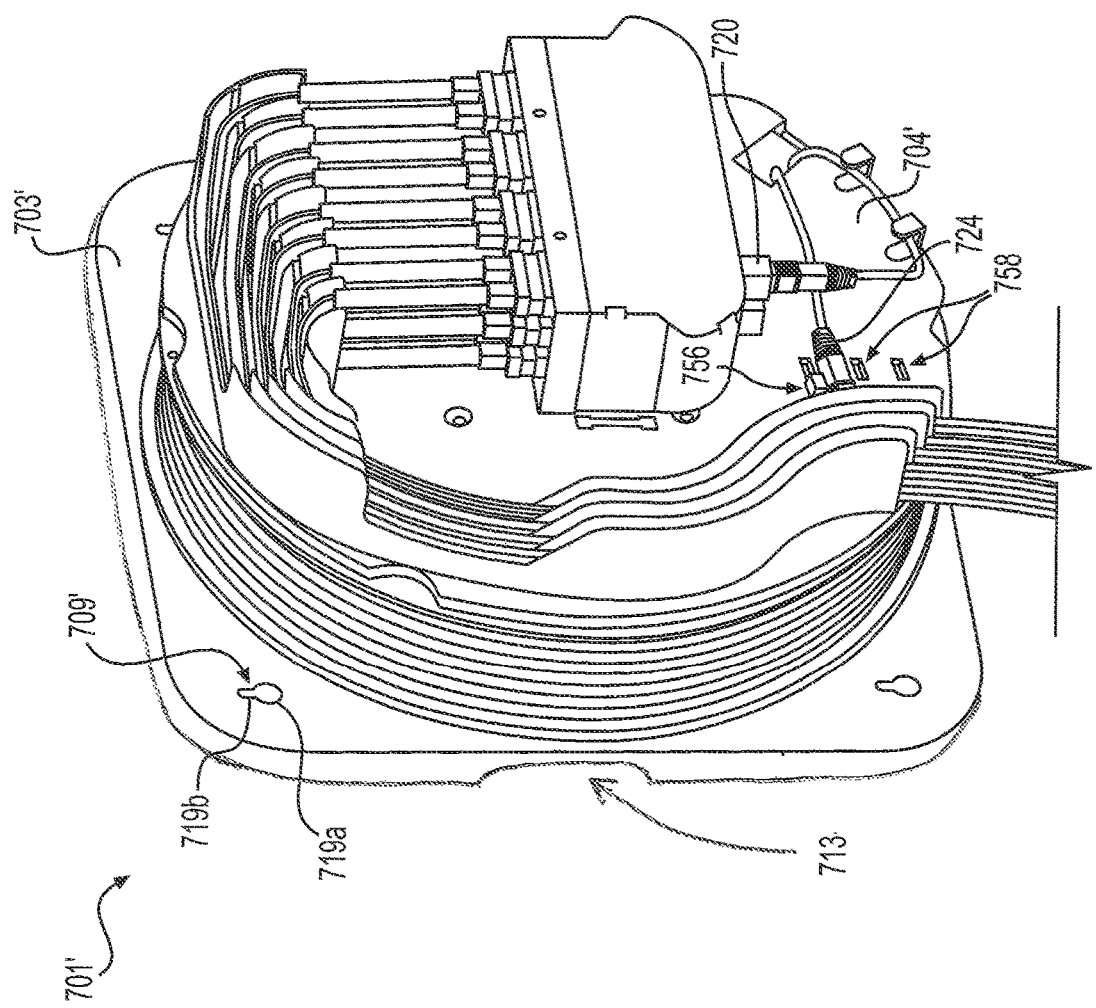
FIGS. 13 and 14 are perspective views of another exemplary terminal system assembly according various aspects of the disclosure and with input and output cables.
Figure 14:
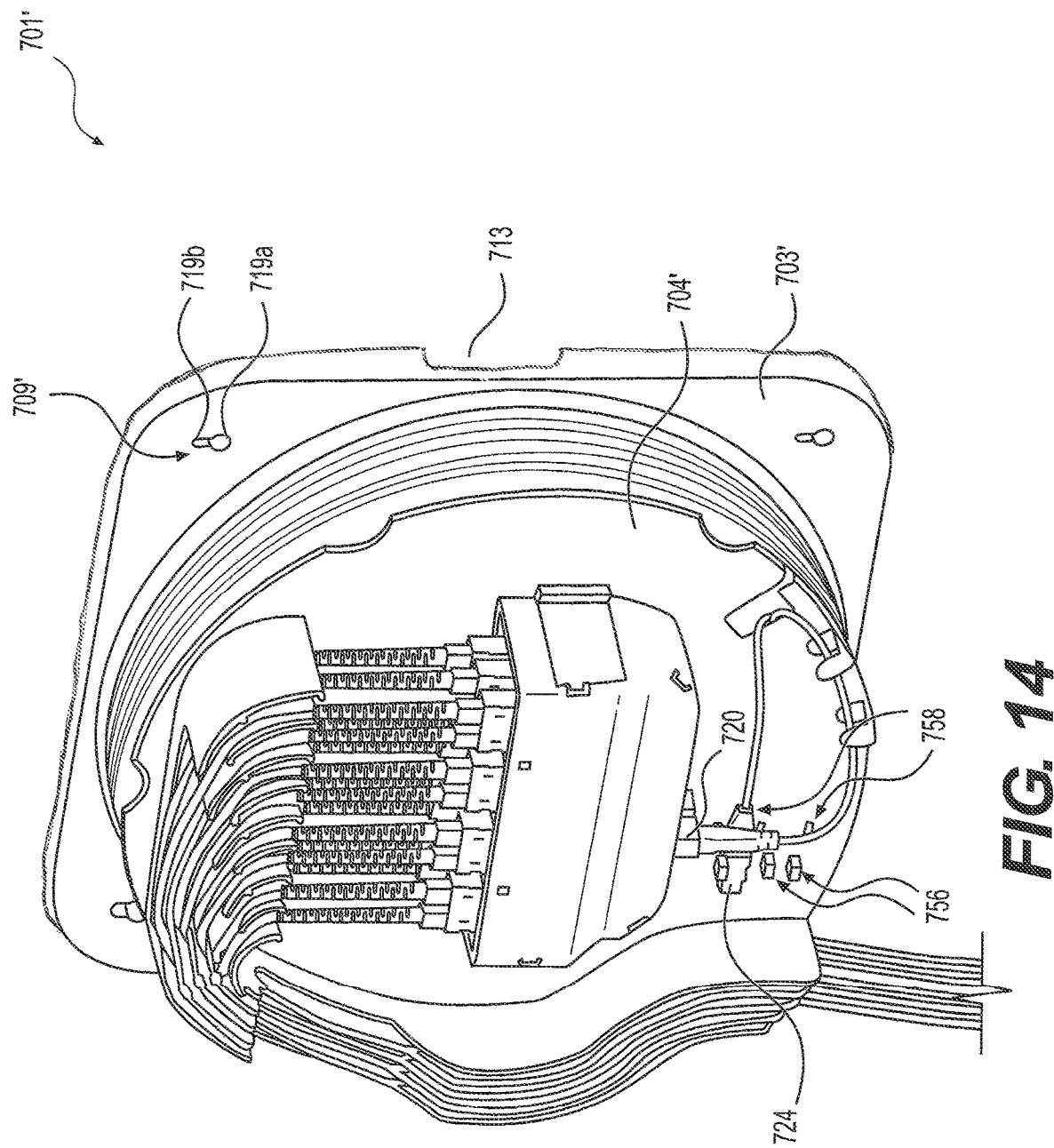

Referring now to FIGS. 13-15, another exemplary TSA 701' is shown. The TSA 701' is similar to TSA 701 described above. However, in TSA 701', the base plate 703' includes positive grip features 713 that allow positive placement of the TSA 701' on a surface without trapping or pinching a user's fingers between the base plate 703' and the mounting surface. For example, the positive grip features 713 may be configured as cutouts or notched regions in opposite side walls of the base plate 703' that are sized to receive a user's fingers. Further, in some aspects, the positive grip features 713 would help to affix the TSA to a mounting surface where the mounting holes 709' are configured as key-hole shaped mounting holes that have a larger region 719a that is configured to receive a head of a faster and a smaller region 719b that is configured to receive the shaft of fastener but is smaller than the fastener head. Such key-hole shaped mounting holes 709' would permit the TSA 701' to be mounted to the mounting surface by aligning the larger regions 719a of the key-hole shaped mounting holes 709' with a fastener extending from the mounting surface, inserting the fastener heads through the larger regions 719a of the mounting holes 709' and sliding the TSA 701 in a direction perpendicular to the fasteners so that the fastener shafts are disposed in the smaller regions 719b of the mounting holes 709', as would be understood by persons skilled in the art. The positive grip features 713 would also provide easy access for gripping the TSA 701' for easy removal from a mounting surface when lifting the TSA 701' upward to align the fastener heads with the larger regions 719a of the mounting holes 709' before removing from the mounting surface.

The TSA 701' also includes two pairs of fingers 756 extending from the cable management plate 704'. Each of the fingers 756 is configured to receive and hold one of the MPO connectors 724 of the input fiber cable(s) 710 when the respective MPO connector is not connected to one of the MPO adapters 720. The TSA 701' may also include two pairs of opening 758 in the cable management plate 704'. The cutouts 758 are aligned relative to the fingers such that a fastener (not shown), such as, for example, a cable tie, a zip tie, a Velcro band, or the like, can be inserted through one of the pairs of openings so as to secure the respective MPO connector to the cable management plate 704', as would be understood by persons skilled in the art.

Additional embodiments include any one of the embodiments described above, where one or more of its components, functionalities, or structures is interchanged with, replaced by or augmented by one or more of the components, functionalities, or structures of a different embodiment described above.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A terminal system assembly comprising:
   a base plate;
   a spool rotatably mounted to the base plate and configured to receive an input fiber cable;
   an adapter module for securing a connection between a fiber of the input fiber cable and a fiber of an output fiber cable;
   a cable management plate coupled with the spool;
   wherein the adapter module is configured to be coupled with the cable management plate;
   wherein the adapter module includes an anti-rotation portion that is configured to cooperate with an anti-rotation portion of the base plate to prevent rotation of the spool and the adapter module relative to the base plate when the adapter module is coupled with the spool;
   wherein the anti-rotation portion of the base plate includes a pair of locking posts extending from a surface of the base plate;
   wherein the anti-rotation portion of the adapter module includes a pair of locking bars extending in opposite directions from opposite sides of the adapter module;
   wherein each of the locking posts has a U-shaped cross-section defining a channel; and
   wherein each of the locking bars is configured to be aligned with and received by a respective one of the locking posts to prevent rotation of the spool and the adapter module.

2. The terminal system assembly of claim 1, wherein the spool is allowed to freely rotate relative to the base plate until the adapter module is coupled with the cable management plate.

3. The terminal system assembly of claim 1, wherein the adapter module includes input ports configured to receive a connectorized end of the input fiber cable and output ports configured to receive connectorized ends of the output fiber cables.

4. The terminal system assembly of claim 1, wherein the adapter module is configured to breakout individual fibers from the input fiber cable and couple each of the individual fibers with an adapter.

5. The terminal system assembly of claim 1, wherein the anti-rotation portion of the adapter module and the anti-rotation portion of the base plate are configured to prevent rotation of the cable management plate relative to the base plate when the adapter module is coupled with the spool.

6. The terminal system assembly of claim 1, wherein the base plate includes positive grip features on opposite side walls of the base plate configured to receive a user's fingers to facilitate mounting of the terminal system assembly to a mounting surface and/or removal of the terminal system assembly from the mounting surface.

7. The terminal system assembly of claim 1, further comprising an enclosure configured to receive the base plate, the spool, the adapter module, and the cable management plate.

8. A terminal system assembly comprising:
   a base plate;
   a spool rotatably mounted to the base plate and configured to receive an input fiber cable;
   an adapter module for securing a connection between a fiber of the input fiber cable and a fiber of an output fiber cable;
   a cable management plate coupled with the spool;
   wherein the adapter module is configured to be coupled with the cable management plate;
   wherein the adapter module includes an anti-rotation portion that is configured to cooperate with an anti-rotation portion of the base plate to prevent rotation of the spool and the adapter module relative to the base plate when the adapter module is coupled with the spool; and
   wherein the spool includes a hub having an opening configured to receive a spindle extending from the base plate, the spindle including the anti-rotation portion of the base plate to prevent rotation of the spool and the adapter module.

9. The terminal system assembly of claim 8, further comprising a spool locking washer having engagement structures configured to be coupled with the anti-rotation portion of the base plate, the anti-rotation portion of the base plate including openings in an end wall of the spindle, and the spool locking washer having including projections extending from an opposite side of the washer relative to the engagement structures, the projections being configured to be coupled with the anti-rotation portion of the adapter module, the anti-rotation portion of the adapter module including openings in a wall of the adapter module.

10. The terminal system assembly of claim 8, wherein the spool is allowed to freely rotate relative to the base plate until the adapter module is coupled with the cable management plate.

11. The terminal system assembly of claim 8, wherein the adapter module includes input ports configured to receive a connectorized end of the input fiber cable and output ports configured to receive connectorized ends of the output fiber cables.

12. The terminal system assembly of claim 8, wherein the adapter module is configured to breakout individual fibers from the input fiber cable and couple each of the individual fibers with an adapter.

13. The terminal system assembly of claim 8, wherein the anti-rotation portion of the adapter module and the anti-rotation portion of the base plate are configured to prevent rotation of the cable management plate relative to the base plate when the adapter module is coupled with the spool.

14. The terminal system assembly of claim 8, wherein the base plate includes positive grip features on opposite side walls of the base plate configured to receive a user's fingers to facilitate mounting of the terminal system assembly to a mounting surface and/or removal of the terminal system assembly from the mounting surface.

15. The terminal system assembly of claim 8, further comprising an enclosure configured to receive the base plate, the spool, the adapter module, and the cable management plate.

16. A terminal system assembly comprising:
a base plate having a spindle;
a spool configured to be rotatingly coupled with the spindle of the base plate and to receive an input fiber cable;
an adapter module configured to couple a fiber of the input fiber cable with a fiber of an output fiber cable;
a cable management plate configured to be coupled with the spool;
a spool locking washer configured to couple the adapter module with the spindle; and
wherein the spool locking washer is configured to prevent rotation of the spool and the adapter module.

17. The terminal system assembly of claim 16, wherein the spool locking washer is configured to be rotatably fixed to the spindle and includes a pair of projections extending from a second side of the spool locking washer, and wherein the adapter module defines a pair of openings configured to receive the pair of projections.

18. The terminal system assembly of claim 16, wherein the spool locking washer includes a snap lock fastener extending from a first side of the spool locking washer, and wherein the snap lock fastener is configured to be aligned with and received by a respective spindle opening.

19. The terminal system assembly claim 16, wherein the spool includes a hub having an opening configured to receive the spindle extending from the base plate.

20. The terminal system assembly of claim 16, wherein the spool is configured to freely rotate relative to the base plate until the adapter module is coupled with the cable management plate.

21. The terminal system assembly of claim 16, wherein the adapter module includes an input port configured to receive a connectorized end of the input fiber cable and an output port configured to receive a connectorized end of the output fiber cable.

22. The terminal system assembly of claim 16, wherein the adapter module is configured to breakout individual fibers from the input fiber cable and couple each of the individual fibers with an adapter.

23. The terminal system assembly of claim 16, wherein the spool locking washer is configured to prevent rotation of the cable management plate relative to the base plate when the spool locking washer is coupled to the adapter module and the spindle.

24. The terminal system assembly of claim 16, wherein the base plate includes positive grip features on opposite side walls of the base plate configured to receive a user's fingers to facilitate mounting of the terminal system assembly to a mounting surface and/or removal of the terminal system assembly from the mounting surface.

25. The terminal system assembly of claim 16, further comprising an enclosure configured to receive the base plate, the spool, the adapter module, and the cable management plate.

26. A terminal system assembly comprising:
a base plate having a spindle;
a spool configured to be rotatingly coupled with the spindle of the base plate and to receive an input fiber cable;
an adapter module configured to couple a fiber of the input fiber cable with a fiber of an output fiber cable;
a spool locking washer configured to couple the adapter module with the spindle and to prevent rotation of the spool and the adapter module relative to the base plate; and
wherein the spool locking washer is configured to prevent rotation of the spool and the adapter module.

27. The terminal system assembly of claim 26, wherein the spool locking washer is configured to be rotatably fixed to the spindle and includes a pair of projections extending from a second side of the spool locking washer, and
wherein the adapter module defines a pair of openings configured to receive the pair of projections.

28. The terminal system assembly of claim 27, wherein the spool locking washer includes a snap lock fastener extending from a first side of the spool locking washer, and
wherein the snap lock fastener is configured to be aligned with and received by a respective spindle opening.

29. The terminal system assembly claim 26, wherein the spool includes a hub having an opening configured to receive the spindle extending from the base plate.

30. The terminal system assembly of claim 26, wherein the spool is configured to freely rotate relative to the base plate until the adapter module is coupled with an upper portion of the spool via at least one adapter module projection being received in an opening defined in the upper portion of the spool.

31. The terminal system assembly of claim 26, wherein the adapter module includes an input port configured to receive a connectorized end of the input fiber cable and an output port configured to receive a connectorized end of the output fiber cable.

32. The terminal system assembly of claim 26, wherein the adapter module is configured to breakout individual fibers from the input fiber cable and couple each of the individual fibers with an adapter.

33. The terminal system assembly of claim 30, wherein the upper portion of the spool is a cable management plate configured to rotate together with a hub of the spool wherein the spool locking washer is configured to prevent rotation of the cable management plate and the hub relative to the base plate when the spool locking washer is coupled to the adapter module and the spindle.

34. The terminal system assembly of claim 26, wherein the base plate includes positive grip features on opposite side walls of the base plate configured to receive a user's fingers to facilitate mounting of the terminal system assembly to a mounting surface and/or removal of the terminal system assembly from the mounting surface.

35. The terminal system assembly of claim 26, further comprising an enclosure configured to receive the base plate, the spool, and the adapter module.

36. A terminal system assembly comprising:
a base plate configured to include an anti-rotation portion;
a spool configured to be rotatingly coupled with the base plate and to receive an input fiber cable;
an adapter module configured to couple a fiber of the input fiber cable with a fiber of an output fiber cable;
a cable management plate configured to be coupled with the spool;
wherein the adapter module is configured to be coupled with the cable management plate;
wherein the adapter module is configured to include an anti-rotation portion configured to include a pair of locking bars extending in opposite directions from opposite sides of the adapter module;
wherein the anti-rotation portion of the base plate is configured to include a pair of locking posts extending from a surface of the base plate and defining a channel configured to receive the locking bars; and
wherein the anti-rotation portion of the adapter module is configured to cooperate with the anti-rotation portion of the base plate to prevent rotation of the spool and the adapter module relative to the base plate when the adapter module is coupled with the spool.

37. The terminal system assembly of claim 36, wherein the spool is allowed to freely rotate relative to the base plate until the adapter module is coupled with the cable management plate.

38. The terminal system assembly of claim 36, wherein the adapter module includes input ports configured to receive a connectorized end of the input fiber cable and output ports configured to receive connectorized ends of the output fiber cables.

39. The terminal system assembly of claim 36, wherein the adapter module is configured to breakout individual fibers from the input fiber cable and couple each of the individual fibers with an adapter.

40. A terminal system assembly comprising:
a base plate configured to include an anti-rotation portion;
a spool configured to be rotatingly coupled with the base plate and to receive an input fiber cable;
an adapter module configured to couple a fiber of the input fiber cable with a fiber of an output fiber cable;
wherein the spool includes a hub having an opening configured to receive a spindle extending from the base plate, and wherein the spindle includes the anti-rotation portion of the base plate; and
wherein the adapter module includes an anti-rotation portion configured to cooperate with the anti-rotation portion of the base plate to prevent rotation of the spool and the adapter module relative to the base plate when the adapter module is coupled with the spool.

41. The terminal system assembly of claim 40, further comprising a cable management plate configured to be coupled with the spool.

42. The terminal system assembly of claim 41, wherein the spool is allowed to freely rotate relative to the base plate until the adapter module is coupled with the cable management plate.

43. The terminal system assembly of claim 40, wherein the adapter module includes input ports configured to receive a connectorized end of the input fiber cable and output ports configured to receive connectorized ends of the output fiber cables.

44. The terminal system assembly of claim 40, wherein the adapter module is configured to breakout individual fibers from the input fiber cable and couple each of the individual fibers with an adapter.

* * * * *